United States Patent
Noreils et al.

(10) Patent No.: US 6,259,913 B1
(45) Date of Patent: Jul. 10, 2001

(54) METHOD OF ALLOCATING LINKS BETWEEN A SET OF AREAS AND A SET OF SATELLITES

(75) Inventors: Fabrice Noreils; Etienne Gaudin, both of Orsay (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/365,398

(22) Filed: Aug. 2, 1999

(30) Foreign Application Priority Data

Aug. 6, 1998 (FR) .................................................. 98 10135

(51) Int. Cl.⁷ ...................................................... H04Q 7/20
(52) U.S. Cl. ...................... 455/429; 455/450; 455/12.1; 370/317
(58) Field of Search ................................... 455/427, 429, 455/12.1, 13.3, 25, 424, 67.3, 67.4, 67.6, 450, 514, 509, 447; 370/323, 317, 316

(56) References Cited

U.S. PATENT DOCUMENTS

| 5,179,722 | * | 1/1993 | Gummar et al. | ..................... 455/33.1 |
|---|---|---|---|---|
| 5,268,694 | * | 12/1993 | Jan et al. | ............................... 342/354 |
| 5,293,640 | * | 3/1994 | Gummar et al. | ..................... 455/33.1 |
| 5,365,571 | * | 11/1994 | Rha et al. | ............................... 379/59 |
| 5,465,390 | * | 11/1995 | Cohen | ................................... 455/33.4 |
| 5,555,257 | * | 9/1996 | Dent | ..................................... 370/95.1 |
| 5,590,395 | * | 12/1996 | Diekelman | .......................... 455/13.1 |
| 5,612,701 | * | 3/1997 | Diekelman | ........................... 342/354 |
| 5,749,044 |   | 5/1998 | Natarajan et al. | .................... 455/134 |
| 6,021,309 | * | 2/2000 | Sherman et al. | .................... 455/12.1 |

FOREIGN PATENT DOCUMENTS

WO 96/14696   5/1996   (WO).

* cited by examiner

Primary Examiner—Edward F. Urban
Assistant Examiner—Marceau Milord
(74) Attorney, Agent, or Firm—Sughrue, Mion, Zinn, Macpeak & Seas, PLLC

(57) ABSTRACT

A method of allocating links between a set of satellites and a set of areas on the ground, the links being determined by a channel, includes the following steps, which are iterated for each channel and for each satellite: constructing an interference graph, and use of the graph by a search algorithm associated with a constraints propagation algorithm to verify the capacities. Applications include satellite communications.

9 Claims, 2 Drawing Sheets

FIG_1
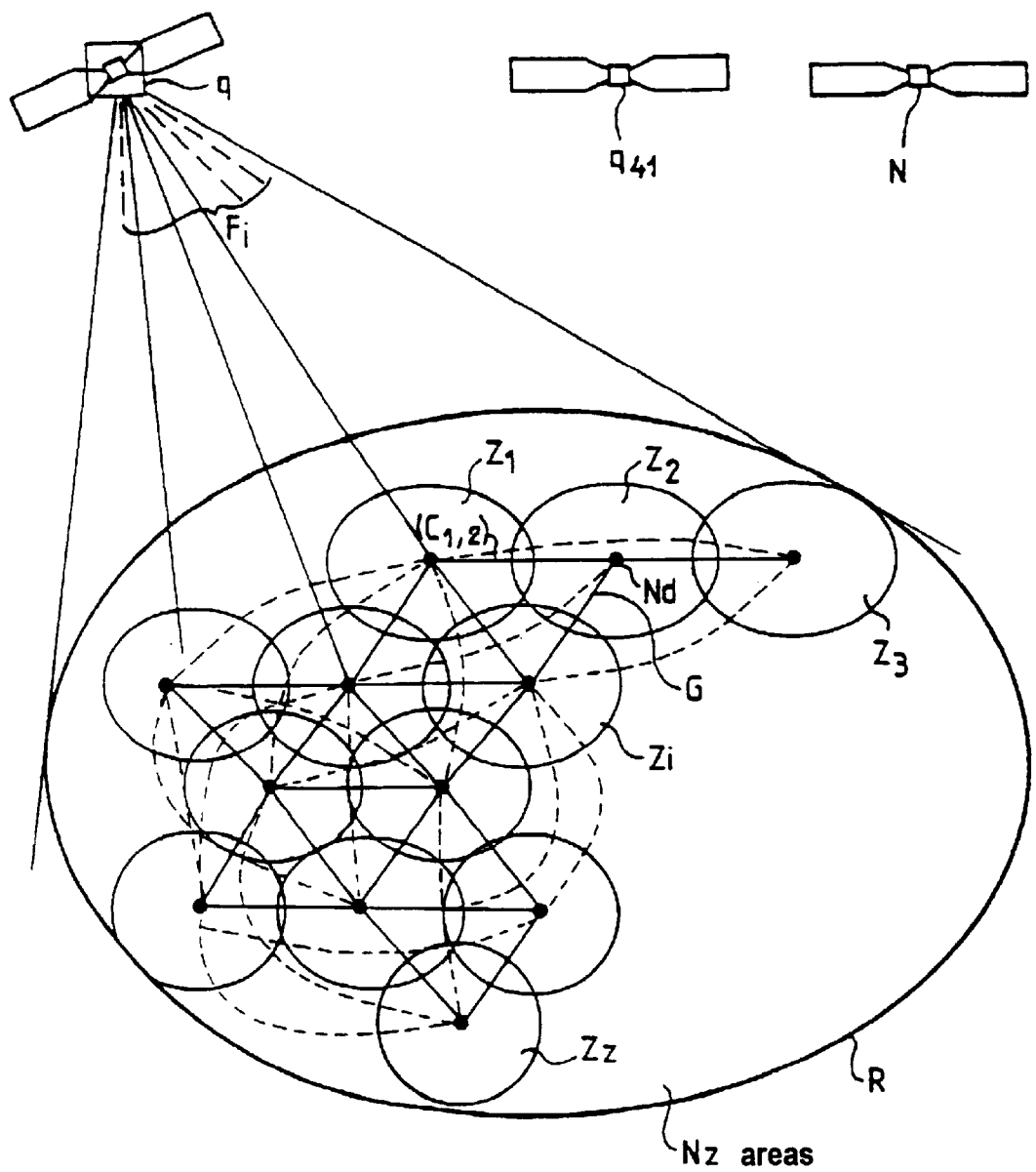

FIG_2

TIME dt : INITIAL CONDITIONS

1) N satellites
   $Z_i$ illuminated by Nq satellites (q = 1 to Nq)
   q { covers $N_2$ areas
       has available A beams $F_i$ and $NF_p$ channels

↓

CONSTRUCTION OF GRAPH AND UPDATING

2) q, $Z_i$ ( CA allocated channels, CD demanded channels)
   i = 1 to $N_z$

↓

SEARCH AND CONSTRAINTS PROPAGATION ALGORITHM

3) Calculate $C_{i,j}$ for $(Z_i, j)$
   k

↓

4) $\sum C_{i,j}(Z_i) < I$
   $i \neq j$

↓

5) $P = \{ Z_i \text{ such that } \sum C_{i,j}(Z_i) < I \}$

— $Z_i \in P$, (candidate $Z_i$) i = 1 to NP
   — Verify if $CD = NF_{max}$
   — If yes include $Z_i$ in P
   — Complete with other candidates $Z_i$
   — Allocate $q(F_i, k)$ to $Z_i$

↓

6) Reiterate steps 2 to 5 for (k+1) up to k=$NF_p$

7) Reiterate steps 2 to 6 for (q+1) up to q=N

METHOD OF ALLOCATING LINKS BETWEEN A SET OF AREAS AND A SET OF SATELLITES

BACKGROUND OF THE INVENTION

1. Field of the Invention

The invention applies to satellite communications and more particularly to a broadband access system using a constellation of satellites in low Earth orbit to provide broadband services, essentially multimedia services.

The invention applies to access systems using geostationary satellites (GEO) and also to access systems using satellites in low Earth orbit (LEO).

2. Description of the Prior Art

The invention applies very particularly to a new broadband access system that is currently under development. This system is called SkyBridge. It will make available to users worldwide services such as fast access to the Internet and videoconferencing. It will use a constellation of 80 LEO satellites which link business and domestic users equipped with low-cost terminals to terrestrial gateways.

The SkyBridge system has two segments:

A space segment: the space segment comprises 80 LEO satellites (plus spare satellites) in orbit at an altitude of 1457 km and the ground control segment comprising the satellite control center and tracking, telemetry and control stations. The space segment provides permanent coverage in the band of latitudes from +68° to −68°. It connects each SkyBridge user to the nearest gateway.

A terrestrial segment: the terrestrial segment comprises the terrestrial gateways and the user terminals. The former provide interconnection via an ATM switch with local servers and with broadband and norrowband terrestrial networks.

The SkyBridge access system is based on the asynchronous transfer mode (ATM) used to connect users to a local switch. Traffic emanating from terminals is transmitted in a transparent manner by the satellite (i.e. without any processing other than amplification and frequency conversion) to the gateway and vice versa. The gateways have switching functions and serve as interfaces with terrestrial networks.

The Earth is divided geographically into areas with a radius of about 350 km which comprise up to 2,000,000 potential clients and a gateway between those clients and the satellites of the constellation which illuminate the area. The station enables clients of the service in that area to communicate with the constellation.

The satellites of a low Earth orbit constellation generally move across the sky and can illuminate a geographical area z defined in the above manner for at least a few minutes and at most around twenty minutes.

The access system must nevertheless provide a certain bit rate between the constellation and the fixed points that the gateways form in this environment.

To this end, it is necessary to optimize the resources available on board each satellite. A way must be found to allocate the resources to points on the ground so that the services offered can be provided and meet the demand from clients.

The resources for a satellite are the number of antennas or individual beams multiplied by the number of channels (frequency resource) available to each satellite in the frequency band reserved to the access system. The generic term "links" will be used in this context.

One way of increasing the number of frequency bands that can be used in the band reserved for the system is to transmit with one or other polarization (which in practice doubles the number of frequency bands in the band reserved to the system). However, this still means that the same channel must not be used for neighboring areas.

A first constraint is then encountered and is due to the problem of interference between waves when using the same frequency band for adjoining areas. Using the same frequency band for neighboring areas (i.e. adjacent or closely spaced areas) causes interference which reduces the signal to noise ratio of the received wave. In this case it is therefore essential not to use the same frequency band for said areas.

Until now this problem has been solved by using link allocation plans fixed over a given period, established for several days and used by all the satellites of the constellation. These plans are communicated to them periodically by a processing management station on the ground.

A solution of this kind is entirely acceptable for existing access systems, i.e. systems with fixed antennas.

For future systems with steerable antennas (steered electrically or mechanically), this solution is not satisfactory because it does not exploit all the resources offered by the dynamic aspect of such systems.

This is the case in particular with the new SkyBridge system with mechanically steered antennas.

The satellites of the constellation of this system will use steerable antennas to produce individual beams illuminating the areas of the system and to keep them pointing toward the corresponding gateways. Each satellite will illuminate a region with a radius of 3000 km.

It is therefore necessary to optimize the allocation of links at all times to take account of additional possibilities offered by steerable antennas, and the prior art solution is therefore no longer acceptable.

The invention solves this problem.

SUMMARY OF THE INVENTION

The invention consists in a method of allocating links between a set of satellites and a set of areas on the ground each equipped with at least one gateway, the links being determined by a channel, the method including the following steps, which are iterated for each channel and for each satellite:

constructing an interference graph, use of the graph by a search algorithm associated with a constraints propagation algorithm to verify the capacities.

By means of the construction of the graph, the method in accordance with the invention identifies all the areas seen by a satellite q, whether they already have a link to that satellite or not, and for which the channel allocation request exceeds the number of channels allocated.

Using a search algorithm that utilizes this graph, the method in accordance with the invention further determines for a given channel and a given satellite the greatest number of areas to which beams of said satellite can be steered for the given channel.

The method also takes into account constraints relating to each value of the variables imposed as the graph is constructed or tied to initial conditions.

Other features and advantages of the method in accordance with the invention will become apparent on reading the following description given with reference to the drawings.

BRIEF DESCRIPTION OF THE DRAWINGS

FIG. 1 is a diagram showing the imprint on the ground of a satellite and the corresponding interference graph.

FIG. 2 shows the steps of the method of the invention.

DETAILED DESCRIPTION OF THE PREFERRED EMBODIMENT

At each time dt, each satellite q illuminates a set of Nz areas Zi in the region R forming the imprint on the ground of the satellite.

The following must be determined for each of these areas:

to which satellite an area must be linked, the channel that can be used for a (satellite, area) combination, which has to comply with a condition concerning the signal/noise ratio to avoid any interference in the calls.

At a given time dt, each area Zi on the ground is seen by Nq satellites of the constellation, which includes N satellites.

Also, at a given time a satellite q covers Nz areas and has A beams and NFp channels that can satisfy the demand for those areas.

The traffic demand of an area is also known, i.e. the number CD of channels demanded. This number is deduced as soon as a maximum acceptable interference threshold I has been set.

The number CA of channels allocated is also known.

When the search algorithm is initialized, this number is generally zero, unless the algorithm starts with initialization data corresponding to a pre-established allocation plan.

As the search algorithm is executed, the number of channels allocated is incremented until it reaches the number CD of channels demanded. When the demand is satisfied, the area Zi concerned is removed from the graph and consequently from the search algorithm (see below).

In a first step I of the method (see FIG. 2), a graph is constructed:

1—A satellite q covers Nz areas at a given time and has A beams and NFp channels, 2—The graph G shown in FIG. 1 is such that each node Nd corresponds to an area Zi ($Z_1$ to $Z_{Nz}$) such that the number CD of channels demanded is higher than the number CA of channels allocated (CD and CA being input data for constructing the graph).

The graph is updated by removing or adding an area as and when links are allocated.

It should be remembered throughout the remainder of the description that a channel is a frequency resource of a satellite which can have several modalities such as the time, the polarization.

Step II consists in having the graph used by a search algorithm associated with a constraints propagation algorithm to verify the capacities.

For a satellite q and a given channel k, the search algorithm determines the greatest number of areas Zi toward which a beam Fi can be pointed by allocating the channel k to that beam.

To this end the following steps are executed:

3—The interference coefficient $C_{i,j}$ is calculated for each pair of areas (Zi, Zj) of the graph for a channel k, k=1 to NFp (number of channels). This coefficient is calculated using a standard method. It consists in calculating the signal to noise ratio in the worst case scenario for the reception conditions, i.e. when transmitting at the same power level and in the same frequency band to all areas. A maximum acceptable interference threshold I can then be fixed.

4—The sum of the interference coefficients $C_{i,i}$ for each area Zi is then compared to the fixed threshold I.

Thus for an area Zi the following calculation is effected: sum $C_{i,j}$ and compare with I (i not equal to j).

5—A partition P is then created with at most A elements (A being the number of available beams) which include Np areas Zi such that for each area the sum of the coefficients $C_{i,j}$ does not exceed the threshold I.

Constraints are introduced when creating the partition. The following are known:

the areas Zi that an antenna can illuminate with its beams (all the visible areas), i=1 to Np, the number of beams illuminating an area Zi and consequently the number of channels. The minimum number of channels corresponds to the number of channels really allocated to the area at a given time during execution of the algorithm. The maximum number of channels is the number of beams multiplied by the number of channels per beam potentially steerable toward that area for all the satellites.

To do this:

take a candidate area Zi (i=1 to Np) from the partition P, verify that CD, the number of channels demanded for that area, is equal to the maximum number of channels for that area, in which case include that area in the partition, complete the partition with the other candidate areas, i.e. the areas Zi for which the verification result is negative but for which the sum of the coefficients $C_{i,j}$ does not exceed the threshold I.

6—The steps of constructing the graph (step 2) are reiterated up to iteration over all the areas of the partition (step 5) for another channel k (k=1 to NFp).

7—All the previous steps are reiterated for the N−1 other satellites.

What is claimed is:

1. A method of allocating links between a set of satellites and a set of areas on the ground each equipped with at least one gateway, said links being determined by a channel, said method comprising the following steps, which are iterated for each channel and for each satellite:

constructing an interference graph, using said graph by a search algorithm associated with a constraints propagation algorithm to determine the greatest number of said areas toward which a beam from said each satellite can be pointed by allocating said channel to said beam.

2. The method of allocating links claimed in claim 1 wherein the construction of said graph at a time at which a satellite covers a number of areas with a number of beams and a number of channels includes the following steps:

constructing said graph for said satellite in which each node of said graph corresponds to an area such that the number of channels demanded for said area is greater than the number of channels allocated, updating said graph by removing or adding an area as and when links are allocated.

3. A method of allocating links between a set of satellites and a set of areas on the ground each equipped with at least one gateway, said links being determined by a channel, said method comprising the following steps, which are iterated for each channel and for each satellite:

constructing an interference graph, use of said graph by a search algorithm associated with a constraints propagation algorithm to verify the capacities, wherein the search algorithm uses the following steps:

calculating an interference coefficient for each pair of areas of the graph for a channel, comparing the sum of the interference coefficients for each area to a predetermined maximum acceptable interference threshold, creating a partition of at most the same number of elements as the number of beams and which includes a number of areas such that for each area the sum of said interference coefficients does not exceed said predetermined threshold.

4. The method of allocating links claimed in claim 3 wherein the creation of said partition includes the following steps:

taking a candidate area from said partition, verifying that the number of channels demanded for said area is equal to the maximum number of channels for said area, in which case said area is included in said partition, completing said partition with the other candidate areas for which the verification result is negative but for which the sum of said interference coefficients does not exceed said threshold.

5. The method of allocating links claimed in claim 1 wherein said iteration for each channel and for each satellite consists in reiterating all the steps of said method for another channel up to the last channel and then reiterating all of the preceding steps for another satellite up to the last satellite.

6. The method of allocating links claimed in claim 3 wherein the construction of said graph at a time at which a satellite covers a number of areas with a number of beams and a number of channels includes the following steps:

constructing said graph for said satellite in which each node of said graph corresponds to an area such that the number of channels demanded for said area is greater than the number of channels allocated, updating said graph by removing or adding an area as and when links are allocated.

7. The method of allocating links claimed in claim 3 wherein said iteration for each channel and for each satellite consists in reiterating all the steps of said method for another channel up to the last channel and then reiterating all of the preceding steps for another satellite up to the last satellite.

8. The method of allocating links claimed in claim 1 wherein said each satellite has a steerable antenna.

9. The method of allocating links claimed in claim 3 wherein said each satellite has a steerable antenna.

\* \* \* \* \*